United States Patent [19]

Okumura

[11] Patent Number: 4,887,185

[45] Date of Patent: Dec. 12, 1989

[54] THROUGH TYPE CAPACITOR

[75] Inventor: Mitsunao Okumura, Kyoto, Japan

[73] Assignee: Murata Manufacturing Co., Ltd., Nagaokakyo, Japan

[21] Appl. No.: 286,209

[22] Filed: Dec. 19, 1988

[30] Foreign Application Priority Data

Dec. 17, 1987 [JP] Japan .............................. 62-193026[U]
Dec. 22, 1987 [JP] Japan .............................. 62-195099[U]
Apr. 7, 1988 [JP] Japan .................................. 62-87651

[51] Int. Cl.$^4$ .............................................. H01G 4/42
[52] U.S. Cl. ....................................................... 361/302
[58] Field of Search ........................ 361/302, 330, 321

[56] References Cited

U.S. PATENT DOCUMENTS 2,983,855  5/1961  Schlicke ............................... 361/302
3,808,478  4/1974  Winkler ................................ 361/302
4,173,745 11/1979  Saunders ........................... 361/302 X
4,642,589  2/1987  Chambers ......................... 361/302 X
4,768,129  8/1988  Sasaki et al. ........................ 361/302

FOREIGN PATENT DOCUMENTS 62-112313  5/1987  Japan .

Primary Examiner—Donald A. Griffin
Attorney, Agent, or Firm—Armstrong, Nikaido, Marmelstein, Kubovcik & Murray

[57] ABSTRACT

A through type capacitor formed of a capacitor unit (or capacitor units) inserted through by a through terminal (or through terminals). The above through type capacitor mainly comprises a through terminal, a capacitor unit, a connecting member and a grounding member. The above grounding member is formed in the manner that the current flowing therethrough flows in the opposite direction to the current flowing through the capacitor unit. The above construction causes the counteracting of the residual inductance to reduce it as much as possible, which realizes a through type capacitor useful in a high frequency range.

16 Claims, 10 Drawing Sheets

THROUGH TYPE CAPACITOR

BACKGROUND OF THE INVENTION (1) Field of the Invention

The present invention relates to a through type capacitor used for various electric and electronic equipment.

(2) Description of the Prior Art

FIGS. 1a and 1b illustrate a conventional through type capacitor having two capacitor units which is used for a magnetron circuit of a microwave oven or the like. FIG. 1a shows a partial cross section and FIG. 1b an equivalent circuit.

This conventional through type capacitor comprises two capacitor units 2, each having a through hole extending throughout the axial length thereof, through which a through terminal 3 is inserted. Each capacitor unit 2 comprises a cylinder, formed of such a dielectric material as ceramic, having an electrode on both ends thereof. An electrode on one end of the capacitor unit 2 is electrically connected with the through terminal 3, and another electrode on the other end of the capacitor unit 2 is electrically connected with a grounding plate 5. A resin cover 6a is placed around the outer peripheral surface of the capacitor unit 2, and another resin cover 6b is inserted into the grounding plate 5. A resin 7 injected from both ends A and B fills the space between the resin cover 6 and the capacitor unit 2, in order to securely insulate the electrode on the above other end of the capacitor unit 2 from the through terminal 3.

As shown in FIG. 1b, noise currents $i_1$ and $i_2$ flow from the A end of the through terminal 3 and pass from one end of the capacitor unit 2 to the other end, until it is bypassed to the grounding plate 5.

Such noise currents inevitably generate a large residual inductance. Practically, if the through type capacitor has a capacitance of approx. 200 pF, a residual inductance of 7 to 10 nH is generated. With such a capacitor, resonance occurs at around 100 MHz, 15 and an impedance of approx. 30 Ω is generated at around 500 MHz. The capacitor absorbs a noise current of only up to 300 MHz max., but does not effectively absorb a noise current having a higher frequency.

SUMMARY OF THE INVENTION

A primary object of the present invention is to provide a through type capacitor which has a small residual inductance and is useful in a high frequency range.

Another object of the present invention is to provide a through type capacitor which reduces the residual inductance in a high frequency range, by making effective use of the skin effect, which is occurred when a noise current has a high frequency.

The above objects are fulfilled by a through type of capacitor formed of a capacitor unit inserted through a grounding member by a through terminal, comprising a through terminal having conductivity and the shape of a rod; a capacitor unit having a first electrode on a first end, a second electrode on a second end of the axial length thereof, and a through hole extending throughout the capacitor unit, through which the through terminal is inserted; a connecting member for electrically connecting the through terminal inserted through the capacitor unit and the first electrode of the capacitor unit; and a grounding member having a connecting portion for being connected with the second electrode of the capacitor unit, a prolonged portion extending up to the first end of the capacitor unit, and a grounding portion at the tip of the prolonged portion.

A first insulating member may be interposed between the through terminal and the through hole of the capacitor unit, and a second insulating member may be interposed between an outer peripheral surface of the capacitor unit and the prolonged portion of the grounding member.

The prolonged portion of the grounding member may have a cylindrical shape for covering the capacitor unit.

The prolonged portion of the grounding member may have at least half the axial length of the capacitor unit.

In a preferred embodiment of the present invention, a male thread ridge is formed on an outer peripheral surface of the prolonged portion of the grounding member.

In the above construction, a noise current makes a U-shape flow, which counteracts the residual inductance. Practically, the residual inductance is reduced to 1/10 or less of a conventional capacitor and the through type capacitor according to the present invention is useful in a frequency range of up to 3 GHz. Consequently, the through type capacitor absorbs a noise current having a higher frequency.

Moreover, if the grounding member comprises a metal tube, it has a shielding effect as a metal case.

In the above construction, the grounding member is wrapped around the capacitor unit with the second insulating member, which is a sheet, therebetween. With such a construction, the high frequency current flowing through the capacitor unit is very close to the current flowing through the grounding member, owing to the skin effect. Also, the current flows through the capacitor unit in a direction opposite to the current flowing through the grounding member. Because of these facts, a magnetic field generated by the current flowing through the capacitor unit and another magnetic field generated by the current flowing through the grounding member counteract each other, and as a result, reduce the residual inductance as much as possible.

The residual inductance may be reduced utilizing the skin effect of a high frequency current by a through type capacitor formed of a capacitor unit inserted through a grounding member by a through terminal, comprising a through terminal having conductivity and the shape of a rod; a capacitor unit consisting of an inner capacitor portion and an outer capacitor portion, each having a first electrode on a first end and a second electrode on a second end of the axial length thereof, wherein the inner capacitor portion is axially longer than the outer capacitor portion, wherein the inner capacitor portion has a through hole through which a through terminal is inserted, and wherein the outer capacitor portion covers the inner capacitor portion; a connecting member for electrically connecting the through terminal inserted through the capacitor unit and the first electrode of the capacitor unit; and a grounding member having a connecting portion for being connected with the second electrodes of the capacitor unit, a prolonged portion extending up to the first end of said capacitor unit, and a grounding portion at the tip of the prolonged portion.

According to the above construction, the outermost capacitor unit, to which the high frequency current is attracted, has a short axial length and a small capacitance. Such a construction realizes a through type capacitor which has a smaller residual inductance and is useful in a higher frequency range.

The objects of the present invention may also be fulfilled by a through type capacitor formed of a capacitor unit inserted through by a through a grounding member terminal, comprising a through terminal having conductivity and the shape of a rod; a capacitor unit having a first electrode on a first end, and a second electrode on a second end of the axial length thereof, and a through hole extending throughout the capacitor unit, through which the through terminal is inserted; a connecting member for electrically connecting the through terminal inserted through the capacitor unit and the first electrode of the capacitor unit; and a return path forming member for leading the current flowing through the capacitor unit to a grounding point, wherein a current flows in the opposite direction to the current flowing from the first electrode to the second electrode of the capacitor unit.

The return path forming member may be an outer capacitor unit for covering the capacitor unit, one end of the outer capacitor unit may be connected with the second electrode of the capacitor unit covered with the outer capacitor unit, and another end of the outer capacitor unit may be connected with the ground.

In the above construction, the noise current flows through the inner capacitor unit and makes a Uturn to flow through the outer capacitor unit in the opposite direction. Consequently, the residual inductance in the inner capacitor unit and the outer capacitor unit counteract each other to be reduced to 1/5–1/10 of that of a conventional through type capacitor. Therefore, the attenuation characteristic shown by the insertion loss - frequency curve is flatter, which realizes a through type capacitor absorbing and restricting enough noise for practical use in a higher frequency range.

BRIEF DESCRIPTION OF THE DRAWINGS

These and other objects, advantages and features of the invention will become apparent from the following description thereof taken in conjunction with the accompanying drawings which illustrate a specific embodiment of the invention. In the drawings:

FIG. 1a is a is a partial cross sectional view of still another embodiment according to the present invention.

DESCRIPTION OF THE PREFERRED EMBODIMENTS

Figure 1A:
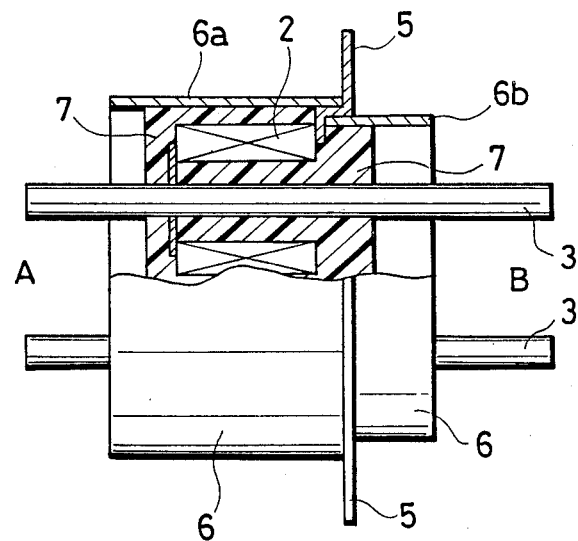
FIG. 1a is a partial cross sectional view of a conventional through type capacitor.
Figure 1B:
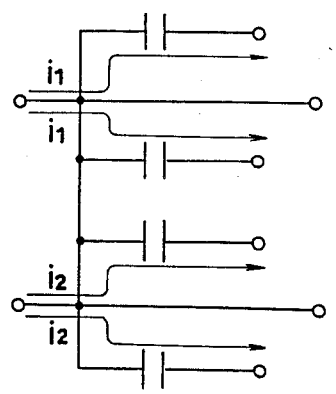
FIG. 1b, is an equivalent circuit diagram of the FIG. 2a is a partial cross sectional view of an embodiment according to the present invention.
Figure 2A:
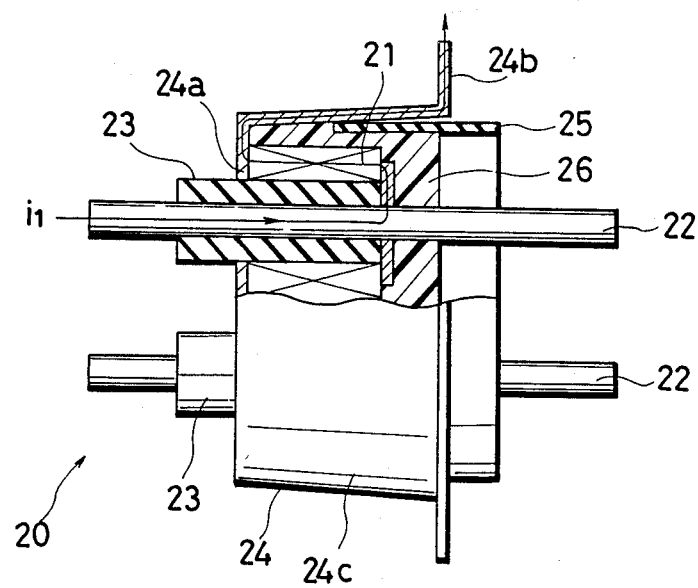
FIG. 2b is an equivalent circuit diagram of the FIG. 3 is a figure showing a detailed construction of a capacitor unit.
Figure 2B:
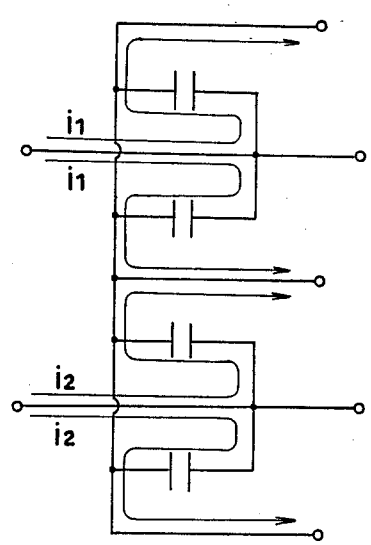

FIGS. 2a and 2b illustrate an embodiment according to the present invention. FIG. 2a shows partial cross section and FIG. 2b an equivalent circuit of a through type capacitor 20 employing two capacitor units 21.

Figure 3:
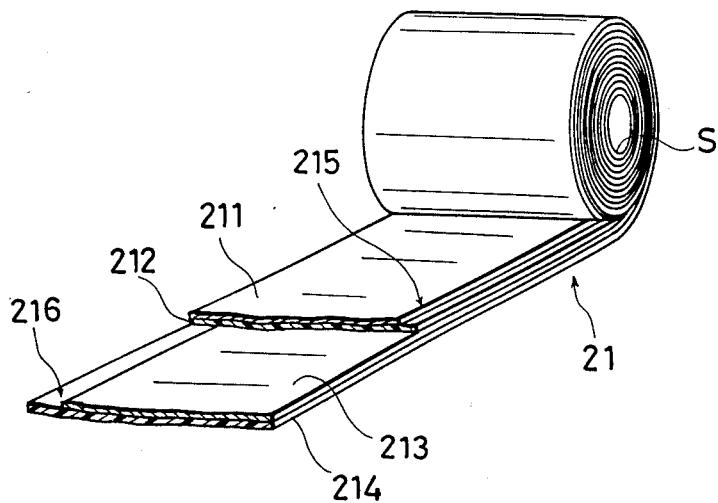

As illustrated in FIG. 3, each capacitor unit 21 comprises a first dielectric film 212 and a second dielectric film 214, both of which are tapes having approximately the same width throughout their length and also with each other. The first dielectric film 212 has a capacitor electrode 211 formed on one main surface thereof, and the second dielectric film 214 has another capacitor electrode 213 formed on one main surface thereof. The above capacitor electrode 213 formed on the second dielectric film 214 is superposed on the other main surface of the first dielectric film 212, and the obtained layers of film is wound into a cylindrical shape around an insulator S.

The capacitor electrode 211 of the first dielectric film 212 and the capacitor electrode 213 of the second dielectric film 214 are both formed by evaporating or sputtering aluminum (Al) or zinc (Zn). The capacitor electrode 211 covers the above one main surface of the dielectric film 212 except a certain width of margin 215 along one side thereof. The capacitor electrode 213 covers the above one main surface of the dielectric film 214 except a certain width of margin 216 along the side thereof facing to the other side of the dielectric film 212. In this way, the capacitor electrode 211 is exposed on one end of the capacitor unit 21, and the capacitor electrode 213 is exposed on the other end of the capacitor unit 21.

The capacitor unit 21 has a metallicon electrode (FIG. 5a) formed on both ends thereof by applying a molten metal. One metallicon electrode is electrically connected with the capacitor electrode 211 of the first dielectric film 212, and the other metallicon electrode with the capacitor electrode 213 of the second dielectric film 214.

A through terminal 22 inserted through the capacitor unit 21 is electrically connected with the electrode on one end thereof. The through terminal 22 is covered with an insulation tube 23, to be insulated from the electrode on the other end of the capacitor unit 21. A grounding casing 24 comprises a metal tube having a cylindrical part 24c which is big enough for the capacitor unit 21 to be inserted into axially. The grounding casing 24 is folded inwardly at one end and outwardly at the other end so as to form a cup-like shape. The inwardly folded part 24a is electrically connected with the far end of the inserted capacitor unit 21. The outwardly folded part 24b is folded at an angle to be connected with such a part as the housing of an equipment. A resin cover 25 is inserted between the grounding casing 24 and the capacitor unit 21, and the space enclosed by the resin cover 25 is filled with a resin 26.

In the foregoing embodiment, a noise current flows through the through terminal 22, the capacitor unit 21 and the grounding casing 24 to the ground. The current flows through the capacitor unit 21 in the opposite direction to the current flowing through the grounding casing 24 around the capacitor unit 21. In other words, the current flows in a U shape as shown with $i_1$ or $i_2$ in FIGS. 2a and 2b. Such a U-shape current flow causes the counteracting of the residual inductance to reduce it to 1/10 or less than that of a conventional through type capacitor. In this embodiment, a cylindrical part 24c of the grounding casing 24 acting as a return path is longer than the axial length of the capacitor unit 21, but they are preferably of the same length. However, it has been confirmed by an experiment that a return path having at least half the axial length of the capacitor unit 21 reduces enough residual inductance for practical use.

The grounding casing 24, moreover, has a shielding effect because it covers the capacitor unit 21 as a metal case.

Figure 4A:
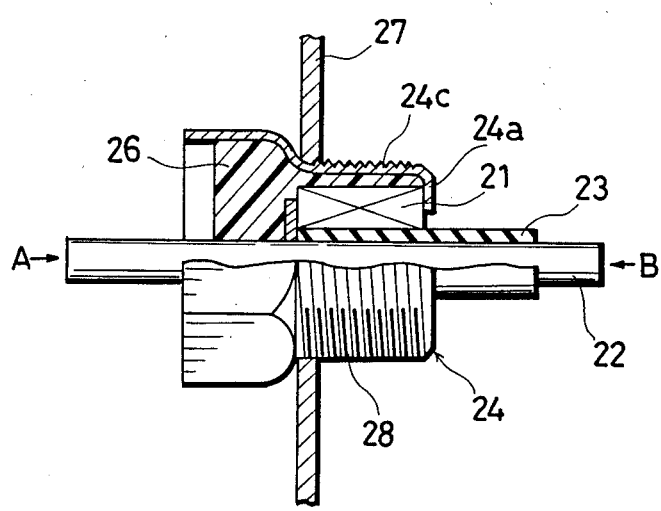
FIG. 4a is a partial cross sectional view of another embodiment according to the present invention.
Figure 4B:
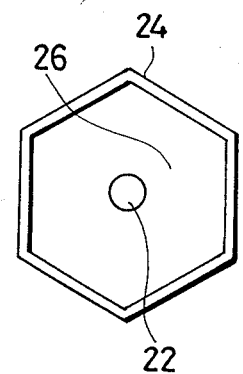
FIG. 4b is an end view of the same.

FIGS. 4a and 4b illustrate another embodiment according to the present invention. FIG. 4a shows a partial cross section and FIG. 4b an end view seen in the direction of an arrow A. The through type capacitor illustrated in these figures is a modification of the embodiment in FIG. 2 and employs one capacitor unit. In this embodiment, a noise current flows in the direction of an arrow B. The construction is almost the same as the embodiment in FIG. 2 except for the grounding casing 24. The grounding casing 24 in this embodiment does not have the outwardly folded part 24b but has a male thread ridge 28 on the outer peripheral surface thereof. On condition that a housing 27 has a female thread ridge, the above construction facilitates attaching and detaching of the through type capacitor to and from the housing 27 with a smaller attaching area. Further, the grounding casing 24, comprising a metal case, covers the capacitor unit 21 as is the embodiment in FIG. 2, and so has a shielding effect. Moreover, if the metal case has a hexagon head as shown in FIG. 4b, it can be attached to the housing 27 by such a tool as wrench, which realizes easier and stronger attachment.

Figure 5A:
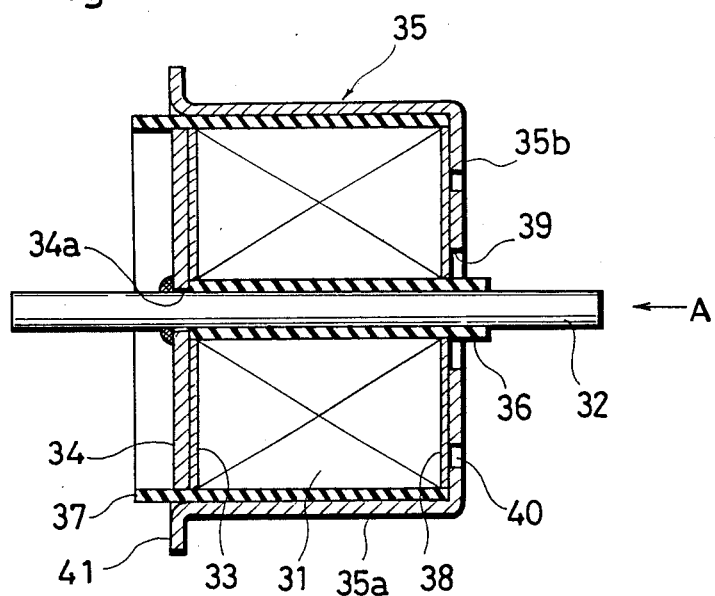
FIG. 5a is a partial cross sectional view of still another embodiment according to the present invention.
Figure 5B:
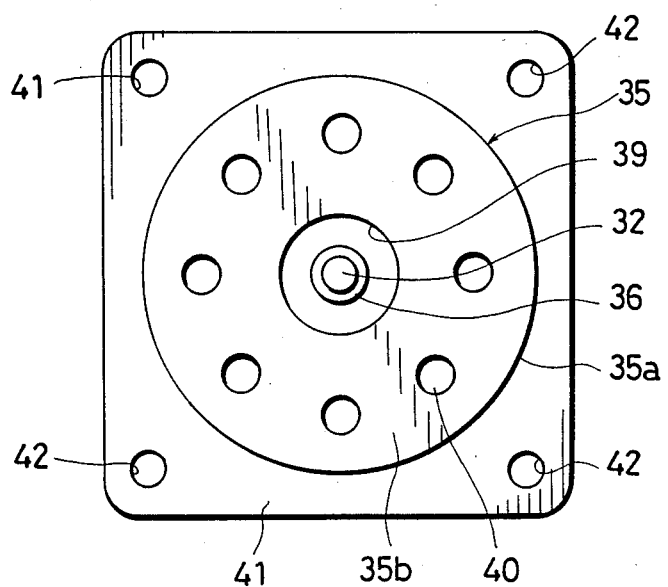
FIG. 5b is an end view of the same.

FIGS. 5a and 5b illustrate still another embodiment according to the present invention. FIG. 5a shows a cross section and FIG. 5b an end view of a through type capacitor employing a single capacitor unit 31.

The above through type capacitor comprises a cylindrical capacitor unit 31 employing a resin film as a dielectric, a through terminal 32 to be inserted through the axis of the capacitor unit 31, a collector 34 to electrically connect the through terminal 32 and the terminal electrode 33 of the capacitor unit 31, a grounding casing 35 to cover the capacitor unit 31, a first insulator 36 to electrically insulate the capacitor unit 31 from the through terminal 32, and the second insulator 37 to electrically insulate the capacitor unit 31 from the grounding casing 35.

The capacitor unit 31 has the same construction as the one in FIG. 3, and so the detailed explanation is omitted here.

A capacitor electrode of the capacitor unit 31 is connected with a terminal electrode 33 formed on one end of the capacitor unit 31. Another capacitor electrode, which produces a capacitance together with the above capacitor electrode, is connected with another terminal electrode 38 formed on the other end of the capacitor unit 31.

The through terminal 32 is partially covered with the insulating tube 36 comprising an insulating resin, and is inserted through the axis of the capacitor unit 31. Then, the through terminal 32 is inserted through a hole 34a at the center of the collector 34, which is obtained by punching a metal plate into a disc. The collector 34 is conductively adhered to the through terminal 32 and to the terminal electrode 33 of the capacitor unit 31 by such a method as soldering.

The grounding casing 35 comprises a metal case having an opening at one end thereof and a cylindrical part 35a for covering approximately the whole length of the capacitor 31. The other end 35b of the grounding casing 35 is a plain surface and has a hole 39 at the center thereof, through which the through terminal 32 is loosely inserted. The end surface 35b of the grounding casing 35 is conductively adhered to the terminal electrode 38 of the capacitor 31 by such a material as solder provided through the hole 39 and another hole 40, which is formed if necessary.

The second insulator 37 comprises an insulating resin sheet. The capacitor unit 31 is covered with the second insulator 37 and is inserted into the grounding casing 35. The second insulator 37 has an axial length which is long enough to partly project from the opening of the grounding casing 35.

The grounding casing 35 has a flange 41 around the opening thereof, which has four mounting holes 42 for fixing the through type capacitor on the chassis or the case of an electronic equipment. Though not shown here, the grounding casing 35 may have a male thread ridge on the outer peripheral surface thereof for screwing the through type capacitor into the chassis or the case of an equipment.

Figure 7:
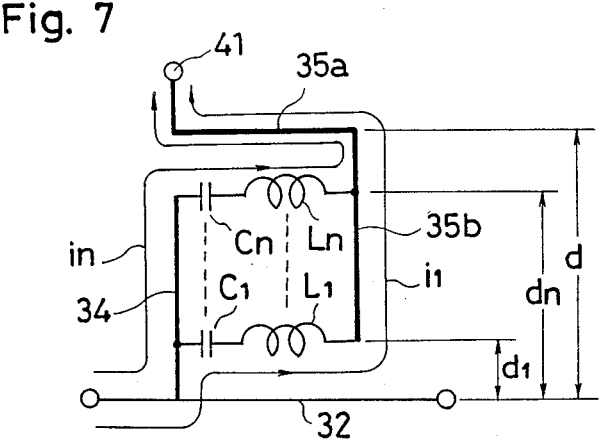
FIG. 7 is an equivalent circuit diagram of the embodiment illustrated in FIG. 5.

The foregoing through type capacitor in FIGS. 5a and 5b has distributed constants as shown by the equivalent circuit in FIG. 7. The above equivalent circuit indicates that series circuits, each consisting of a capacitance Ck (k=1, 2, ..., n) and an inductance Lk (k=1, 2, ..., n), are formed between the collector 34 and the grounding casing 35. The above series circuits are accumulated in the radial direction of the through terminal 32, and each of them is placed with a distance dk (k=1, 2, ..., n) from the through terminal 32. It is known that, provided the distance between the through terminal 32 and the cylindrical part 35a of the grounding casing 35 is d, the inductance Lk is in proportion to $$\log d/d_k \qquad (1)$$

This means that the bigger k becomes, namely, the closer inductance Lk is to the cylindrical part 35a of the grounding casing 35, the smaller the inductance Lk becomes.

A high frequency current flows through the through terminal 32, the above-mentioned circuit of the capacitance and the inductance in the capacitor unit 31, and the cylindrical part 35a of the grounding casing 35 until it is bypassed to the flange 41. The high frequency current has a tendency that the higher the frequency is, the more distance it keeps from the through terminal 32. In other words, the higher the frequency is, the smaller the current $i_1$ is which is flowing through the series circuit of the capacitance $C_1$ and the inductance $L_1$, and the bigger the current $i_n$ is which is flowing through the series circuit of the capacitance $C_n$ and the inductance $L_n$. This means that when the frequency is high, the current is attracted to flow through the outermost series circuit of the capacitance $C_n$ and the inductance $L_n$. Here, when k=n, d/dk is minimum (1.2 to 1.05). Because the inductance Lk is in proportion to (1), $L_n$, namely, the residual inductance of the through type capacitor, is minimum. The above is also apparent from the fact that, because the high frequency current flows through the series circuit of the capacitance $C_n$ and the inductance $L_n$, which is closest to the grounding casing 35, a magnetic field generated by the above high frequency current flowing through the above series circuit and another magnetic field generated by the high frequency current flowing in the opposite direction through the grounding casing 35 effectively counteract each other.

Figure 9:
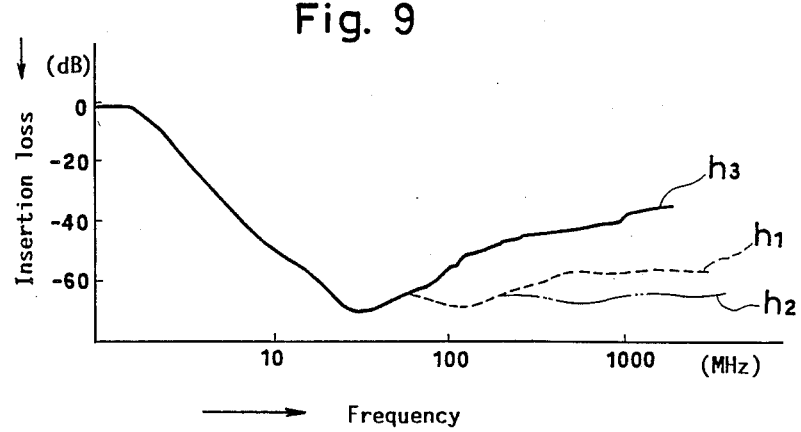
FIG. 9 is a line graph showing the relationship between insertion loss and frequency of the embodiments illustrated in FIGS. 5 and 6.

The relationship between insertion loss and frequency of the through type capacitor in FIG. 5 was examined, and the result is shown with a dashed line $h_1$ in FIG. 9. A solid line $h_3$ shows the above relationship of a conventional through type capacitor. According to these results, the through type capacitor in FIG. 5 has 20 dB bigger insertion loss than the conventional one at 1,000 MHz.

Figure 6A:
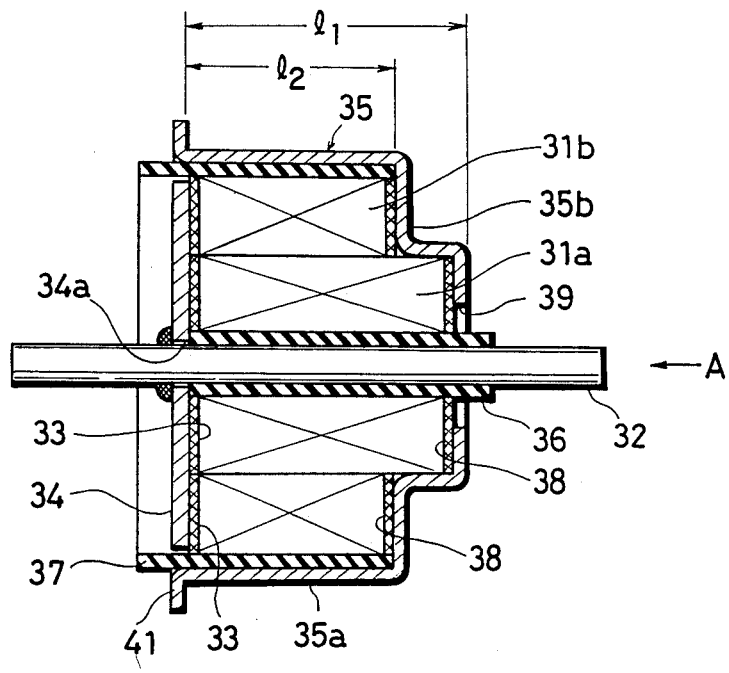
FIG. 6a is a partial cross sectional view of still another embodiment according to the present invention.
Figure 6B:
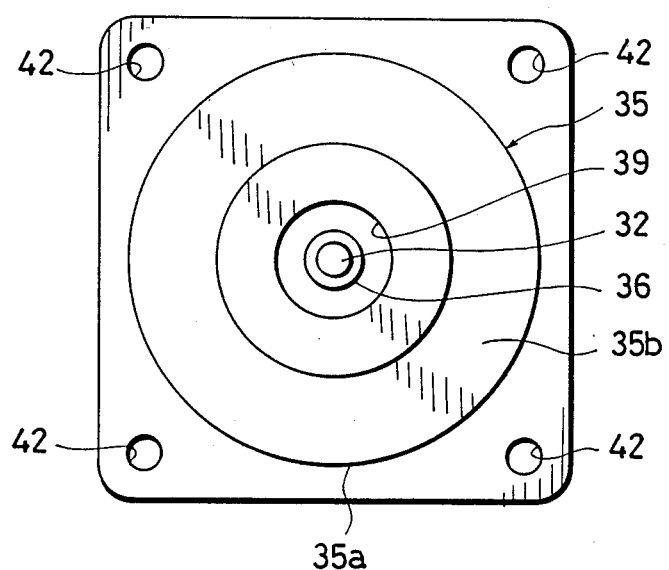
FIG. 6b is an end view of the same.
Figure 8:
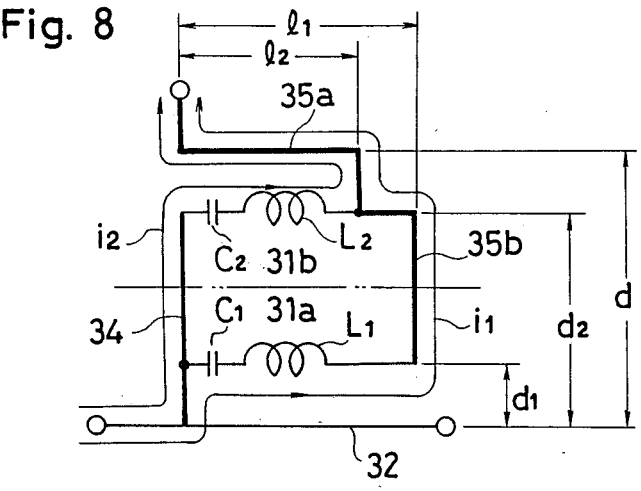
FIG. 8 is an equivalent circuit diagram of the embodiment illustrated in FIG. 6.

FIGS. 6a, 6b and 8 illustrate still another embodiment according to the present invention. FIG. 6a shows a vertical cross section, FIG. 6b an end view, and FIG. 8 an equivalent circuit of the embodiment.

The through type capacitor illustrated in these figures is a modification of the embodiment in FIG. 5. The capacitor unit 31 is radially divided at least into two capacitor units 31a and 31b, and the length $l_2$ of the outer capacitor unit 31b, which is closer to the grounding casing 35, is shorter than the length $l_1$ of the inner capacitor unit 31.

Because the high frequency current tends to flow through the circuit closest to the grounding casing 35, it flows a shorter path and so reduces the residual inductance.

FIGS. 6a and 6b employ the identical numbers as the corresponding parts in FIGS. 5a and 5b, and the explanation is omitted here where otherwise would be repeated.

A two-dot chain line $h_2$ in FIG. 9 shows the relationship between insertion loss and frequency of the through type capacitor in FIG. 6. This capacitor has approximately 10 dB bigger insertion loss at 1,000 MHz.

Figure 10A:
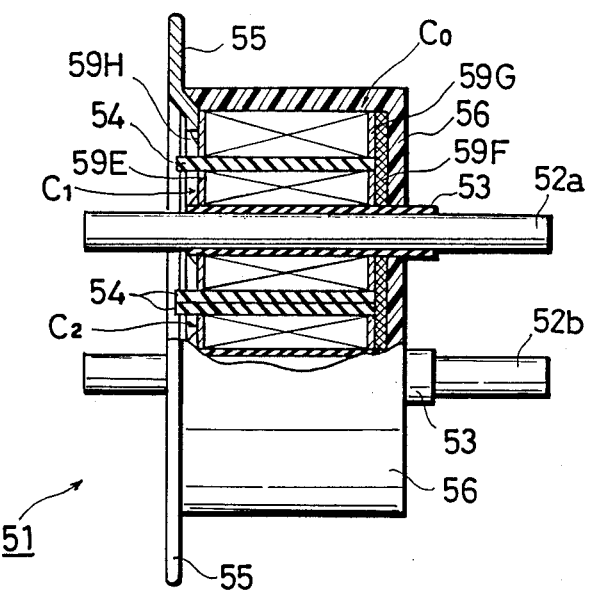
FIG. 10b is an end view of the same.
Figure 10B:
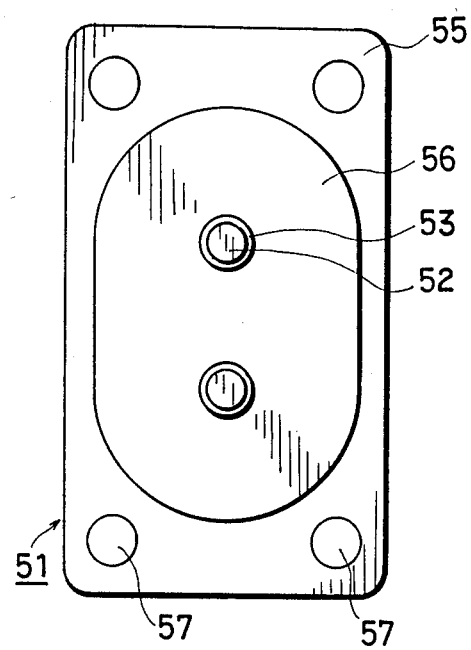

FIGS. 10a and 10b illustrate still another embodiment according to the present invention. FIG. 10a shows a partial cross section and FIG. 10b an end view of a through type capacitor 51 for high voltage use.

The through type capacitor 51 for high voltage use comprises three capacitor units $C_0$, $C_1$ and $C_2$, two through terminals 52a and 52b, insulating tubes 53, insulating sheets 54, a grounding plate 55 and a resin mold 56. The grounding plate 55 has four mounting holes 57.

The capacitor units $C_0$, $C_1$ and $C_2$ have cylindrical shapes as shown in FIGS. 14a, 14b, 15a and 15b, and comprise dielectric films. They have metallicon electrodes connected with both ends thereof. The first capacitor units $C_1$ and $C_2$ both have a 50 to 100 times bigger capacitance (0.01 to 0.5 $\mu$F) than the second capacitor unit $C_0$ and both have a withstand voltage of approx. 100 V. The second capacitor unit $C_0$ has a capacitance of approx. 200 to 500 pF and a withstand voltage of approx. 5 kV. The capacitor unit $C_0$ is wound into an elliptic cylinder with a hole in the center thereof so that it may cover the capacitor units $C_1$ and $C_2$ arranged in parallel in the same axial direction.

The capacitor units $C_1$ and $C_2$ have through terminals 52a and 52b inserted therethrough, respectively. The through terminals 52a and 52b are soldered with metallicon electrodes 59E on the ends of the capacitor units $C_1$ and $C_2$ closer to the grounding plate 55, and are insulated from electrodes 59F on the other ends by the insulating tubes 53.

The capacitor units $C_1$ and $C_2$ are individually covered with insulating sheets 54, are arranged in parallel in the same axial direction, and are inserted into the capacitor unit $C_0$. The electrodes 59F, which are insulated from the through terminals 52a and 52b, are soldered on the whole surface of an electrode 59G of the capacitor unit $C_0$ on the end facing the electrodes 59F. An electrode 59H on the end of the capacitor unit $C_0$ closer to the grouding plate 55 is insulated from the metallicon electrodes 59E on the same ends of the capacitor units $C_1$ and $C_2$ by the insulating sheets 54. The electrode 59H is soldered with a grounding plate 55. The resin mold 56 covers the outer surface of the capacitor unit $C_0$.

Figure 11:
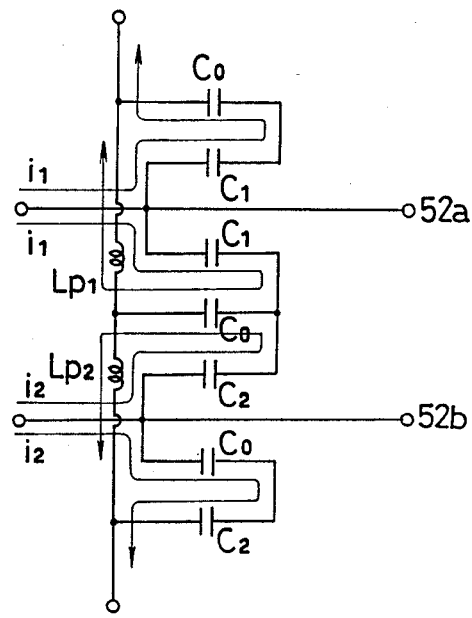
FIG. 11 is an equivalent circuit diagram of the embodiment illustrated in FIG. 10, FIGS. 12a and 12b are end views of still another embodiment according to the present invention.

FIG. 11 is an equivalent circuit diagram of the through type capacitor 51 for high voltage use. Noise currents $1_1$ and $i_2$ flow in the directions of the arrows.

The noise currents $i_1$ and $i_2$ respectively flow through the through terminals 52a and 52b and the capacitor units $C_1$ and $C_2$ until they make a U-turn to flow through the capacitor unit $C_0$. Here, the currents flow through the capacitor units $C_1$ and $C_2$ in the opposite direction to the currents flowing through the capacitor unit $C_0$, to cause the counteracting of the residual inductance. The relationship between insertion loss and frequency of the through type capacitor 51 for high voltage use is shown with the thick dashed line in FIG. 16. As shown here, resonance is restricted until 700 to 800 MHz, and the insertion loss characteristic is flatter than that of a conventional one, shown with the solid line, in which there is no counteracting of residual inductance.

The conventional through type capacitor for high voltage use has several resonance points over 100 MHz, which reflect the resonance between residual inductance and floating capacitance generated when the lead wires are taken out or when the capacitor is mounted.

In FIG. 10b, the grounding plate 55 has only four mounting holes 57 on the corners thereof. With this setting, the center of the grounding plate 55 and the housing of an equipment are incompletely connected with each other to make the current flow an extra distance. As a result, big local inductances $L_{p1}$ and $L_{p2}$ of 3 to 5 nH are generated on the grounding plate 55. When this is considered a serious problem, the grounding plate 55 can be modified as follows.

Figure 12A:
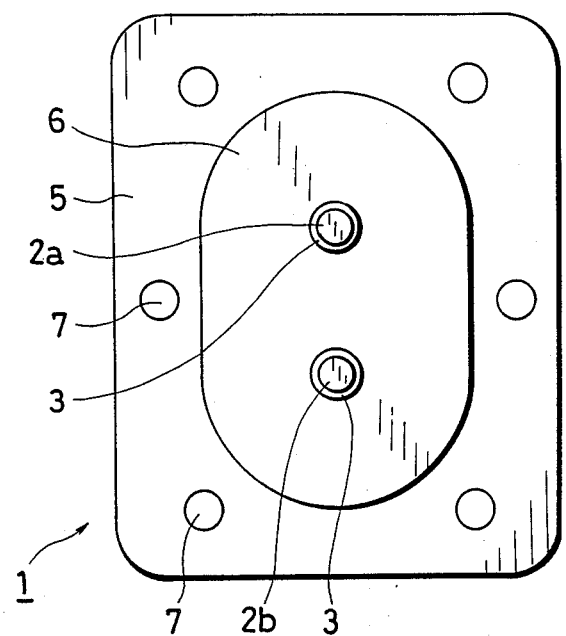
Figure 12B:
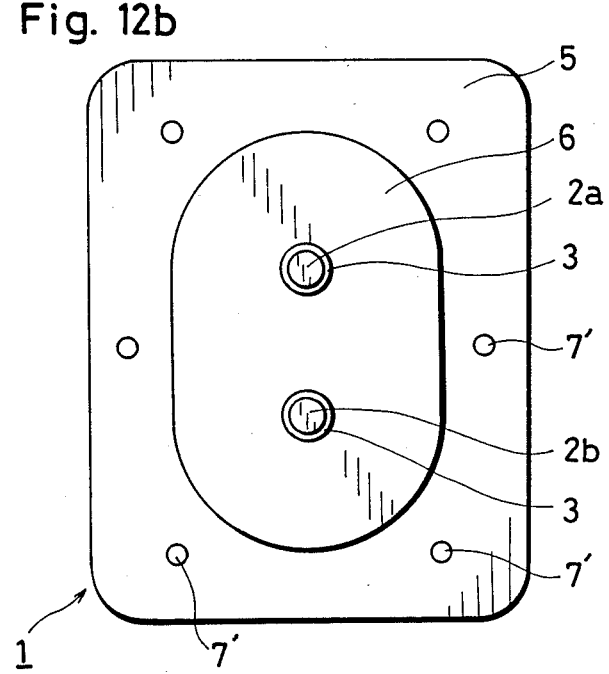
Figure 13:
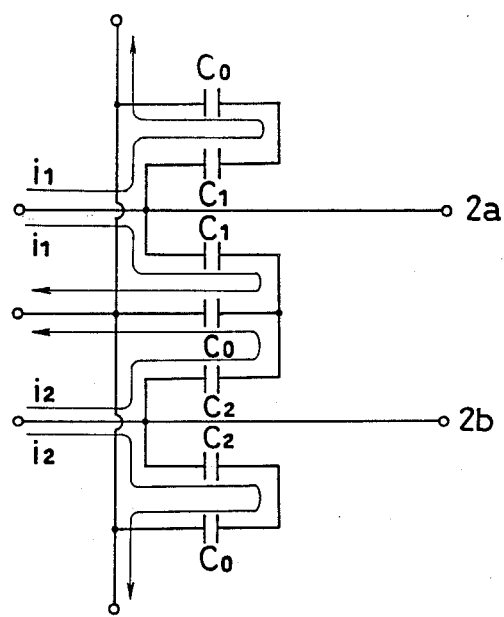
FIG. 13 is an equivalent circuit diagram of the same, FIGS. 14 and 15 respectively show an inner capacitor unit and an outer capacitor unit of the embodiment illustrated in FIG. 10.
Figure 14A:
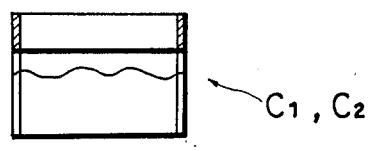
Figure 14B:
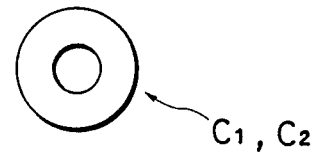
Figure 15A:
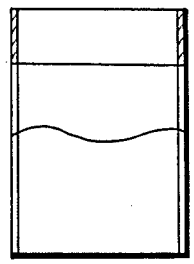
Figure 15B:
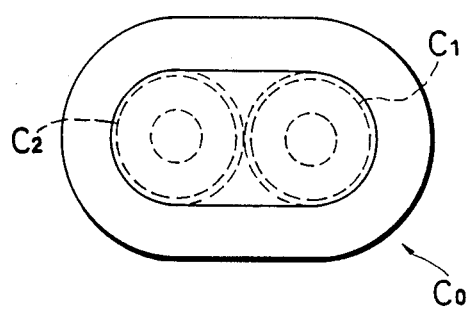
Figure 16:
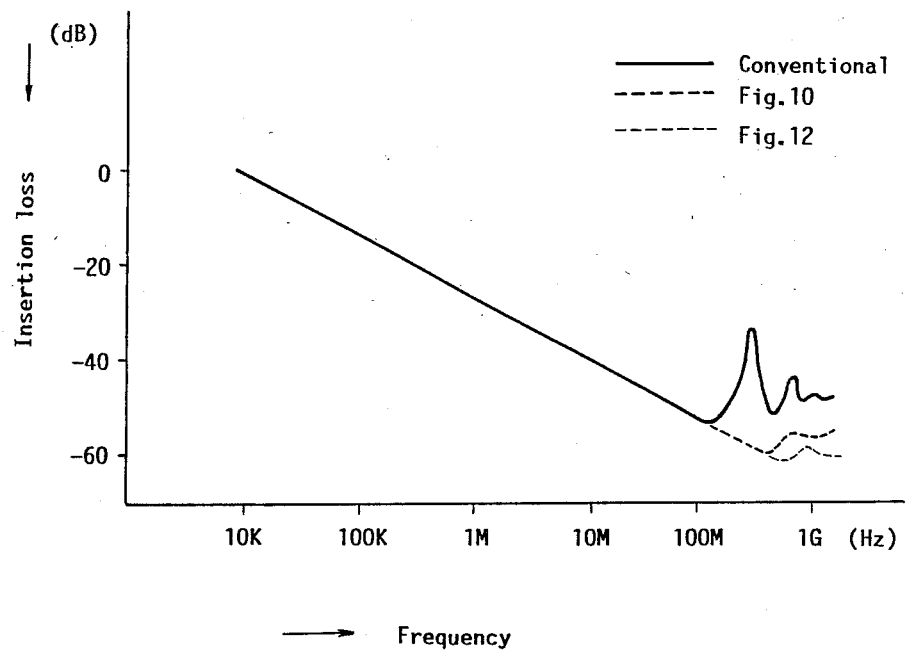
FIG. 16 is a line graph showing the relationship between insertion loss and frequency of the embodiments illustrated in FIGS. 10 and 12.

As shown in FIG. 12a, two more mounting holes may be made on the center of the longer sides of the grounding plate 55. Or, as shown in FIG. 12b, the grounding plate 55 may be spot-welded at the same positions as the above six mounting holes in FIG. 12a. By these methods, the capacitor units $C_1$ and $C_2$ are mounted on the housing almost coaxially, which reduces local inductances $L_{p1}$ and $L_{p2}$ in FIG. 11. The result is shown in the equivalent circuit in FIG. 13. Practically, the total residual inductance of the capacitor units $C_0$, $C_1$ and $C_2$ is reduced to 1/5 to 1/10, the local inductance on the grounding plate 55 to 1/2 to 1/3, and the floating capacitance to a neglectable value. The insertion loss - frequency curve in this case, shown by the thin dashed line in FIG. 16, is 20 to 30% flatter than that of the embodiment in FIG. 10.

In the above embodiment, the capacitor units $C_0$, $C_1$ and $C_2$ comprise films. If the desirable characteristic is to be obtained with no need for considering weight, manufacturing cost, capacitance fluctuation, or the like, dielectrics such as ceramic may be employed. As for the number of mounting holes, a required number to obtain the desirable characteristic, if more than six, can be made.

Although the present invention has been fully described by way of embodiments with reference to the accompanying drawings, it is to be noted that various changes and modifications will be apparent to those skilled in the art. Therefore, unless otherwise such changes and modifications depart from the scope of the present invention, they should be construed as being included therein.

What is claimed is:

1. A through type capacitor formed of a capacitor unit having a through terminal inserted there through and a grounding member surrounding the capacitor unit, comprising:
   a through terminal having conductivity and the shape of a rod,
   a capacitor unit having a first electrode on a first end, a second electrode on a second end of the axial length thereof, and a through hole extending throughout said capacitor unit, through which said through terminal is inserted,
   a grounding member formed in a cup-like shape with an outer portion having an opening at one end and a bottom portion at the other end,
   a connecting member electrically connecting said through terminal inserted through said capacitor unit and the first electrode of said capacitor unit near said opening, and
   said grounding member having a connecting portion connected with the second electrode of said capacitor unit at said bottom portion, such that current flow through the outer portion of the grounding member is in the opposite direction to current flow through said capacitor unit.

2. A through type capacitor as claimed in claim 1 comprising;
   a first insulating member interposed between said through terminal and the through hole of said capacitor unit, and
   a second insulating member interposed between an outer peripheral surface of said capacitor unit and the outer portion of said grounding member.

3. A through type capacitor as claimed in claim 1, wherein the outer portion of said grounding member has at least half the axial length of said capacitor unit.

4. A through type capacitor formed of a capacitor unit having a through terminal inserted therethrough and a grounding member surrounding the capacitor unit, comprising;
   a through terminal having conductivity and the shape of a rod,
   a capacitor unit consisting of an inner capacitor portion and an outer capacitor portion, each having a first electrode on a first end and a second electrode on a second end of the axial length thereof, wherein the inner capacitor portion is axially longer than the outer capacitor portion, wherein the inner capacitor portion has a through hole through which a through terminal is inserted, and wherein the outer capacitor portion covers the inner capacitor portion,
   a grounding member formed in a cup-like shape with an outer portion having an opening at one end and a bottom portion at the other end,
   a connecting member electrically connecting said through terminal inserted through said capacitor unit and the first electrode of said capacitor unit near said opening, and
   said grounding member having a connecting portion connected with the second electrodes of said capacitor unit at said bottom portion, such that current flow through said outer portion of the grounding member is in a direction opposite to current flow through said capacitor unit.

5. A through type capacitor as claimed in claim 4, wherein the connecting portion of said grounding member has a step so that the connecting portion may be in contact with the second electrodes of both the inner and outer capacitor portions when the inner and outer capacitor portions are aligned at the first end thereof.

6. A through type capacitor as claimed in claim 4 comprising;
   a first insulating member interposed between said through terminal and the through hole of the inner capacitor portion, and
   a second insulating member interposed between an outer peripheral surface of the outer capacitor portion and the outer portion of said grounding member.

7. A through type capacitor as claimed in claim 4, wherein the outer portion of said grounding member has at least half the axial length of the inner capacitor portion.

8. A through type capacitor formed of a capacitor unit inserted through by a through terminal, comprising;
   a through terminal having conductivity and the shape of a rod,
   a capacitor unit having a first electrode on a first end, and a second electrode on a second end of the axial length thereof, and a through hole extending throughout said capacitor unit, through which said through terminal is inserted,
   a connecting member for electrically connecting said through terminal inserted through said capacitor unit and the first electrode of said capacitor unit, and
   a return path forming member for leading the current flowing through said capacitor unit to a grounding point, wherein a current flows in the opposite direction to the current flowing from the first electrode to the second electrode of said capacitor unit.

9. A through type capacitor as claimed in claim 8, wherein said return path forming member is a metal case comprising a connecting portion for being connected with the second electrode of said capacitor unit, an outer portion extending from the connecting portion up to the first end of said capacitor unit and a grounding portion formed on the tip of the outer portion.

10. A through type capacitor as claimed in claim 9, wherein the outer portion of said grounding member has a cylindrical shape for covering said capacitor unit.

11. A through type capacitor as claimed in claim 9, wherein the outer portion of said grounding member has at least half the axial length of said capacitor unit.

12. A through type capacitor as claimed in claim 8, wherein said return path forming member is an outer capacitor unit for covering said capacitor unit, and
wherein one end of said outer capacitor unit is connected with the second electrode of said capacitor unit covered with said outer capacitor unit, and wherein another end of said outer capacitor unit is connected with the ground.

13. A through type capacitor comprising;
two through terminals both having conductivity and the shape of a rod,
two first capacitor units, each having a first electrode on a first end and a second electrode on a second end of the axial length thereof and each being inserted through by each of said through terminals, wherein said through terminals are electrically connected respectively with the first ends of said first capacitor units, and
a second capacitor unit covering said two first capacitor units, wherein an electrode on the end thereof closer to the second ends of said first capacitor units is connected with the second electrodes of said first capacitor units and wherein another electrode on the other end thereof is connected with a grounding metal plate.

14. A through type capacitor formed of a capacitor unit having a through terminal inserted therethrough and a grounding member surrounding the capacitor unit, comprising:
a through terminal having conductivity and the shape of a rod,
a capacitor unit having a first electrode on a first end, a second electrode on a second end of the axial length thereof, and a through hole extending throughout said capacitor unit, through which said through terminal is inserted,
a grounding member formed in a cup-like shape with an outer portion having a male threaded ridge and an outer peripheral surface, an opening at one end and a bottom portion at the other end,
a connecting member electrically connecting said through terminal inserted through said capacitor unit and the first electrode of said capacitor unit near said opening, and
said grounding member having a connecting portion connected with the second electrode of said capacitor unit at said bottom portion, such that current flow through the outer portion of the grounding member is in the opposite direction to current flow through said capacitor unit.

15. A through type capacitor as claimed in claim 14 comprising:
a first insulating member interposed between said through terminal and the through hole of said capacitor unit, and
a second insulating member interposed between an outer peripheral surface of said capacitor unit and the outer portion of said grounding member.

16. A through type capacitor as claimed in claim 14, wherein the outer portion of said grounding member has at least half the axial length of said capacitor unit.

* * * * *

UNITED STATES PATENT AND TRADEMARK OFFICE
CERTIFICATE OF CORRECTION

PATENT NO. : 4,887,185
DATED : December 12, 1989
INVENTOR(S) : Mitsunao OKUMURA

It is certified that error appears in the above-identified patent and that said Letters Patent is hereby corrected as shown below:

On the cover page, Item [30], line 4, "62-87651" should read

--63-87651--.

Signed and Sealed this

Twenty-ninth Day of January, 1991

*Attest:*

HARRY F. MANBECK, JR.

*Attesting Officer*      *Commissioner of Patents and Trademarks*